United States Patent
Mungikar et al.

(10) Patent No.: US 9,552,298 B2
(45) Date of Patent: Jan. 24, 2017

(54) SMART PRE-FETCH FOR SEQUENTIAL ACCESS ON BTREE

(71) Applicants: Shailesh Mungikar, Pune (IN); Blaine French, Concord, MA (US)

(72) Inventors: Shailesh Mungikar, Pune (IN); Blaine French, Concord, MA (US)

(73) Assignee: Sybase, Inc., Dublin, CA (US)

( * ) Notice: Subject to any disclaimer, the term of this patent is extended or adjusted under 35 U.S.C. 154(b) by 164 days.

(21) Appl. No.: 14/142,312

(22) Filed: Dec. 27, 2013

(65) Prior Publication Data

US 2015/0186283 A1    Jul. 2, 2015

(51) Int. Cl.
*G06F 12/08* (2016.01)
*G06F 12/12* (2016.01)
*G06F 17/30* (2006.01)

(52) U.S. Cl.
CPC ........ *G06F 12/0862* (2013.01); *G06F 12/12* (2013.01); *G06F 17/30* (2013.01); *G06F 12/0871* (2013.01); *G06F 12/0897* (2013.01); *G06F 2212/1024* (2013.01); *G06F 2212/466* (2013.01); *G06F 2212/602* (2013.01); *G06F 2212/6028* (2013.01)

(58) Field of Classification Search
CPC ............... G06F 12/0866; G06F 2212/2146; G06F 3/061; G06F 3/0638; G06F 3/0683
See application file for complete search history.

(56) References Cited

U.S. PATENT DOCUMENTS

| 6,721,490 | B1 * | 4/2004 | Yao ................. H04N 21/23106 348/E5.008 |
| 2010/0153654 | A1 * | 6/2010 | Vorbach ............ G06F 12/0862 711/137 |

\* cited by examiner

*Primary Examiner* — Yong Choe
(74) *Attorney, Agent, or Firm* — Sterne, Kessler, Goldstein & Fox P.L.L.C.

(57) ABSTRACT

Methods and systems configured to facilitate smart pre-fetching for sequentially accessing tree structures such as balanced trees (b-trees) are described herein. According to various described embodiments, a pre-fetch condition can be determined to have been met for a first cache associated with a first level of a tree such as a b-tree. A link to a bock of data to be read into the cache can be read into the cache by accessing a second level of the tree. The data elements associated with the retrieved link can subsequently read into the cache.

20 Claims, 10 Drawing Sheets

SMART PRE-FETCH FOR SEQUENTIAL ACCESS ON BTREE

BACKGROUND

Background

Tree structures can be used to store data in an ordered fashion. For instance, one kind of tree structure is a balanced tree or "b-tree." B-trees comprise a number of nodes organized along a parent-child relationship. In general, parent nodes will store data (or pointers and/or links to data) having a particular value and link to a number of "children" nodes that also store data (or, again, links to data) having a particular value. At leaf level, the nodes will store data. Typically, a given parent node will have a "left" child that stores values less than the smallest value stored by the parent and a number of "right" children, each corresponding to a subset of values in parent, that store data having values greater than the greatest value in that particular subset in the parent. Consider, for instance, a simple b-tree having three nodes. If the parent node stores data with a value of 2, then the left child node might store data with a value of 1 and the right child node might store data with a value of 3. When a tree has both its left arm and right arm populated (and any associated sub-arms) the tree is said to be "balanced."

When accessing the various values stored in the nodes of a tree, it is necessary to jump across "levels" of the tree to retrieve the values. For instance, if you wanted to sequentially retrieve the values in the simple example above, you might begin with the left child to retrieve "1" and then jump to the parent level to retrieve "2" and jump back down, again, to the child level to retrieve "3". In other words, traversing the tree sequentially can be non-linear in nature. In cases of larger trees in particular, this can require multiple visits to non-leaf levels, which results in additional costs in terms of IO (input and output), cache invalidation, and in worst case possible thrashing (repeated swap-in, swap-out) in memory-constrained environment.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for storing data in a database using a tree structure.

As discussed above, a b-tree can comprise a number of different levels, where each non-root level has one or more nodes. In practice, each node comprises a block of memory that holds a number of values. Nodes also have a "left" link to a sub-tree with values less than any of the values stored in its associated memory block. Additionally, each of the values in a node has a corresponding "right" link to a sub-tree values greater than any of the values stored in its associated memory block. This architecture leads to blocks of memory segments that each hold a sub-tree at a particular level. A sub-tree at a non-leaf node in turn is represented using multiple segments, each holding values belonging to a particular level in the b-tree.

Sequential access of values stored in a b-tree is non-linear since accessing the next data element occasionally requires moving from one level to another. For instance, to access the smallest value the parent nodes should be accessed first to find the data element belonging to the left most leaf. From there on, the access to leaf-level memory segments is linear (accessing segments is in order of values). However, a memory segment representing non-leaf level (e.g., a parent node) needs to be visited multiple times in order to finish accessing all of its child levels. An example of this can be seen in FIG. 1.

Figure 1:
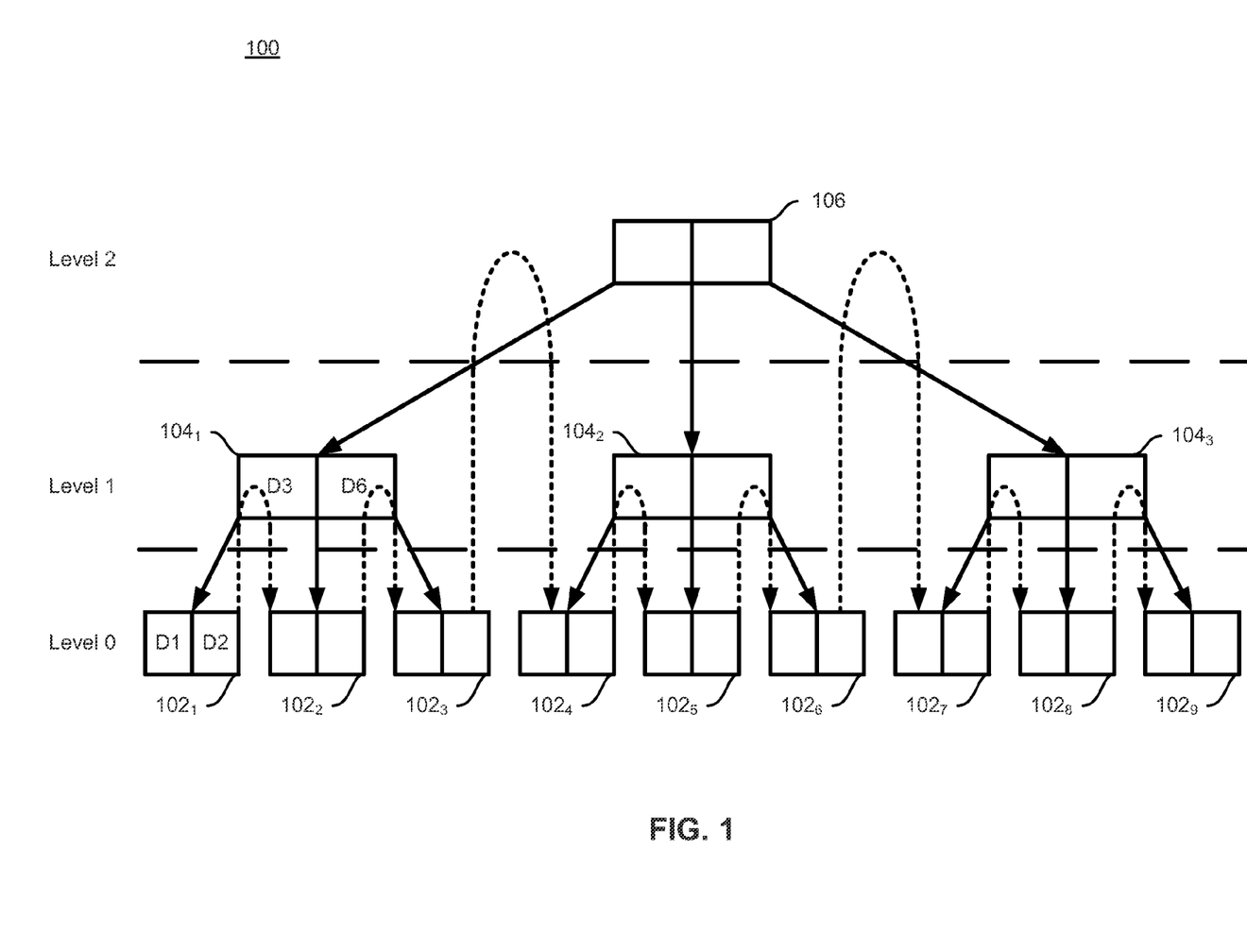
FIG. 1 is a representation of an exemplary tree structure according to various embodiments of the disclosure. The solid lines represent links and dotted lines represent access sequence in case of sequential access.

FIG. 1 depicts sequential access of a tree structure 100 having three levels, level 0, level 1, and level 2 according to various embodiments. As shown in FIG. 1, level 0 comprises a number of leaf nodes $102_1$ to $102_9$ (generically referred to herein as "leaf nodes 102"). Level 1 comprises parent nodes $104_1$, $104_2$, and $104_3$ (generically referred to herein as "parent nodes 104"). Finally, level 2 comprises a single root node 106. Nodes 102, 104, and 106 each have an associated block of data containing a number of data elements. For instance, as shown in FIG. 1, node $102_1$ is associated with a block of data containing the data elements D1 and D2. The data elements may, in turn, each comprise a value and a link to a "right" node (as discussed below). While each block associated with the various nodes in FIG. 1 are depicted as having only two data elements, this depiction is simply for ease of explanation and the disclosure is not so limited. Indeed, in practice each of the blocks of data associated with the nodes 102, 104, and 106 could contain a very large (e.g., hundreds or thousands or more) number of data elements and/or values.

Each of the nodes (with the exception of the leaf nodes) may contain links to a number of other nodes. Typically, a node will contain link to a "left" node and one or more links to "right" nodes. For instance, in FIG. 1, each of the root node 106 and the child nodes 104 links to three other nodes. However, it should be understood that any number of nodes could be chosen according to various embodiments. In the example in FIG. 1, tree structure 100 illustrates lower-value data elements are on the left side of a node and larger value data elements are on the right side. For instance, the values stored in the block contained in node $102_1$ (i.e., the values associated with data elements D1 and D2) have lower values than the smallest data element (i.e., D3) stored in the block belonging to node $104_1$. According to some embodiments, each data element contains a value that is paired with a "right" link. For instance, data element D3, which is stored in the block associated with node $104_1$, might be stored as a pair: the value of D3 and a link to node $102_2$, which contains values "to the right" (i.e., greater than) the value associated with D3. Similarly, data element D6 contain a value that is paired with a link to node $102_3$, which contains a block of data storing data elements with values greater than the value associated with data element D6.

The process for accessing each of the values stored in the tree-structure 100 sequentially could begin by accessing data elements D1 and D2 from the block associated with node $102_1$. However, to access the next value (D3), the block associated with node $104_1$ should be accessed to get the link to the next node. The value pair of D3 can then be retrieved to get the link for the block associated with node $102_2$ before accessing the data elements stored in the block associated with leaf node $102_2$. Similarly, after the remaining data stored in leaf node $102_2$ was accessed, node $104_1$ should be accessed again before accessing the data stored in node $102_3$. Thus, to access the data stored in the leaves of a single node $104_1$, the node $104_1$ should be accessed twice in the interim. Of course, in actual use, b-trees can have significantly more leaf nodes, which would necessitate a significantly greater number of accesses of the parent node $104_1$.

Prefetching is a technique that anticipates a pattern of access to the data elements and reads them ahead of the actual request. This technique helps reduce time spent in searching the element and reading it in memory, especially for large data structures, which are stored on disk. When accessing a b-tree in a sequential manner, an efficient pre-fetch method that can anticipate which leaf and non-leaf level nodes it will read ahead is beneficial.

By nature, a b-tree has a majority of its elements in leaf level. There is, therefore, a benefit to prefetching more elements from the leaf level compared to the non-leaf levels. Indeed, in general, there is a benefit to prefetching lower levels over higher levels because a lower level will always have more elements and/or nodes than a higher level.

Again, a sequential access of the data stored (or linked to by) the tree 100 might begin by accessing the data associated with the left-most node $102_1$. Once the data elements in node $102_1$ have been accessed, jump up to parent node $104_1$ to retrieve the first value stored there before jumping back down to node $102_2$ to retrieve the data stored there. After accessing the data in nodes $102_2$ completely, jump back up to node $104_1$ (level 1) to access the second value stored in node $104_1$ before, again, jumping down to level 0 to access the data stored in node $102_3$. To access the left most value stored in root node 106, jump up to level 2, and so on. This process can continue until the data block stored in the right most node (i.e., node $102_9$ in the example in FIG. 1) is accessed. As can be seen, this sequential access of the tree 100 data involves quite a number of jumps between levels, which can be time consuming and costly in terms of resources.

Instead, certain nodes can be prefetched ahead and stored in a cache in order to facilitate faster access to the data. Such a pre-fetch process is described with respect to FIGS. 2A through 2D.

Figure 2A:
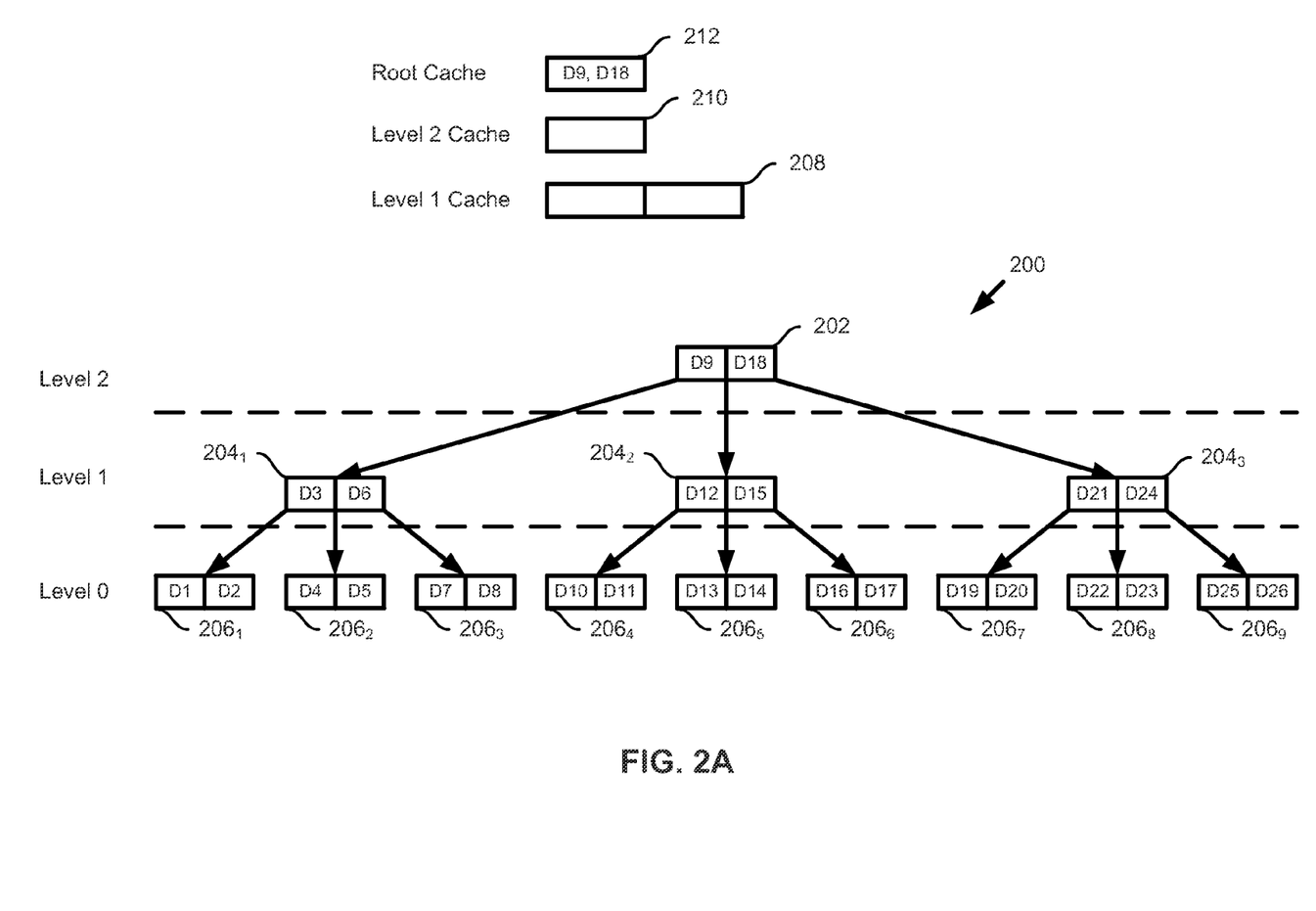
FIGS. 2A-2D depict an exemplary algorithm for prefetching data elements according to various embodiments of the disclosure.

FIG. 2A depicts a simplified tree structure 200 having three levels: level 0, 1, and 2. It should, however, be understood that the described methodology could apply to a tree structure of any size having any number of associated nodes and/or levels. As shown in FIG. 2A, the tree structure 200 includes a parent node 202 and three child nodes $204_1$, $204_2$, and $204_3$ (collectively "child nodes 204"). Each of the child nodes is further associated with leaf nodes $206_1$-$206_9$ (collectively "leaf nodes 206"). For instance, child node $204_1$ is associated with leaf nodes $206_1$, $206_2$, and $206_3$. Similarly, Child node $204_2$ is associated with leaf nodes $206_4$, $206_5$, and $206_6$ and child node $204_3$ is associated with leaf nodes $206_7$, $206_8$, and $206_9$.

As shown in FIGS. 2A through 2D, each of the nodes contains two data elements, which are represented in the tree structure 200 as D1 to D26 and arranged in a balanced fashion in the parent node 202, child nodes 204, and leaf nodes 206. As such, the data element with the lowest value (D1) is stored in the left-most portion of the left-most node $206_1$ and the data element with the largest value (D26) is stored in the right most portion of the right most node $206_9$.

Additionally, FIG. 2A depicts caches 208 and 210, which are associated with levels 1 and 2 of the tree structure 200, respectively. These caches can be used to store blocks of data associated with the various nodes of tree structure 200 thereby enabling faster data access. For instance, level 1 cache 208 can store data associated with the nodes in level 0. Similarly, the level 2 cache 210 can store data associated with the nodes in level 1. In some embodiments, there might also be a root cache 212 storing the block of data associated with root node 202. However, it is not, strictly speaking, necessary. According to various embodiments, the caches 208 and 210 can be maintained as full as possible to maximize their effect. It may, however, not always be possible to keep caches 208 and 210 full if caches 208 and 210 are larger than the amount of data that remains to be cached. Additionally, while not strictly necessary, there are certain advantages to having larger caches associated with lower levels. For instance, in the example shown in FIG. 2A, the level 1 cache 208 is larger than the level 2 cache 210. Such an arrangement can be advantageous because tree structures (e.g., tree structure 200) generally have more nodes at lower levels and, thus, more data to be cached at the lower levels. While FIGS. 2A-2D depict caches 208 and 210 as being able to accommodate 2 and 1 blocks, respectively, this is just for exemplary purposes and it should be understood that the caches 208 and 210 may be of any size based on resource availability. The size (both relative and absolute) of the caches 208 and 210 can be either static or dynamic according to various embodiments. For instance, according to some embodiments, the size of the various caches may change as a function of the amount of data stored in the tree structure 200 and/or the number of levels a particular tree structure (e.g., tree structure 200) has.

Figure 2B:
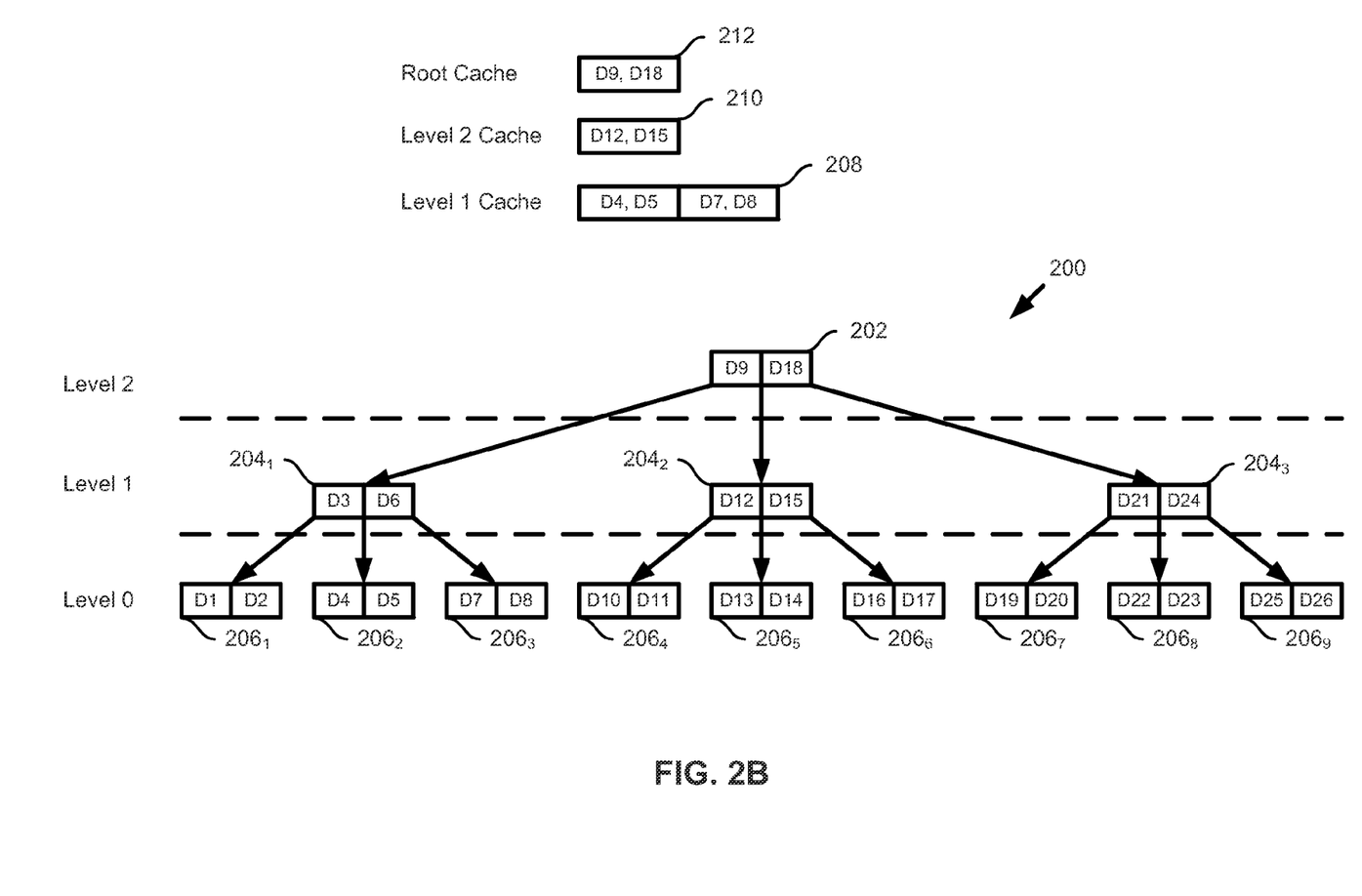

FIG. 2B depicts tree structure 200 after some of the blocks associated with various nodes have been pre-fetched and stored in caches 208 and 210. Specifically, the blocks associated with nodes $206_2$ (containing data elements D4 and D5) and $206_3$ (containing data elements D7 and D8) have been pre-fetched and stored in level 1 cache 208 by accessing the memory linked to by leaf nodes associated with the values stored in child node $204_1$. It is worth noting that, in this initial case, the blocks associated with in leaf nodes $206_1$ and $204_1$ do not need to be cached because the initial sequential read of node $206_1$ will have already taken place and, accordingly, stored the blocks associated with nodes $206_1$ and $204_1$ in memory.

As shown, the blocks associated with nodes $206_2$ and $206_3$ are cached in sequence. That is, the left-most unread block (i.e., the block that stores the data elements having the smallest values) is stored in the left-most position of the level 1 cache 208. In this case, that would be the data block associated with node $206_2$ and containing data elements D4 and D5. After fetching the block associated with node $206_2$ the next block can be fetched and similarly stored in the level 1 cache 208. As shown in FIG. 2B, this is the data block associated with node 206$_3$ and storing data elements D7 and D8.

FIG. 2B also depicts the block associated with node 204$_2$ (and containing data elements D12 and D15) stored in the level 2 cache 210. As was the case with the level 1 cache 208, the block associated with node 204$_1$ would have been already accessed by the time the pre-fetch process was invoked. Accordingly, the block associated with node 204$_1$ (and containing data elements D3 and D6) would already be stored in memory and would not have to be pre-fetched and stored in level 2 cache 210.

Figure 2C:
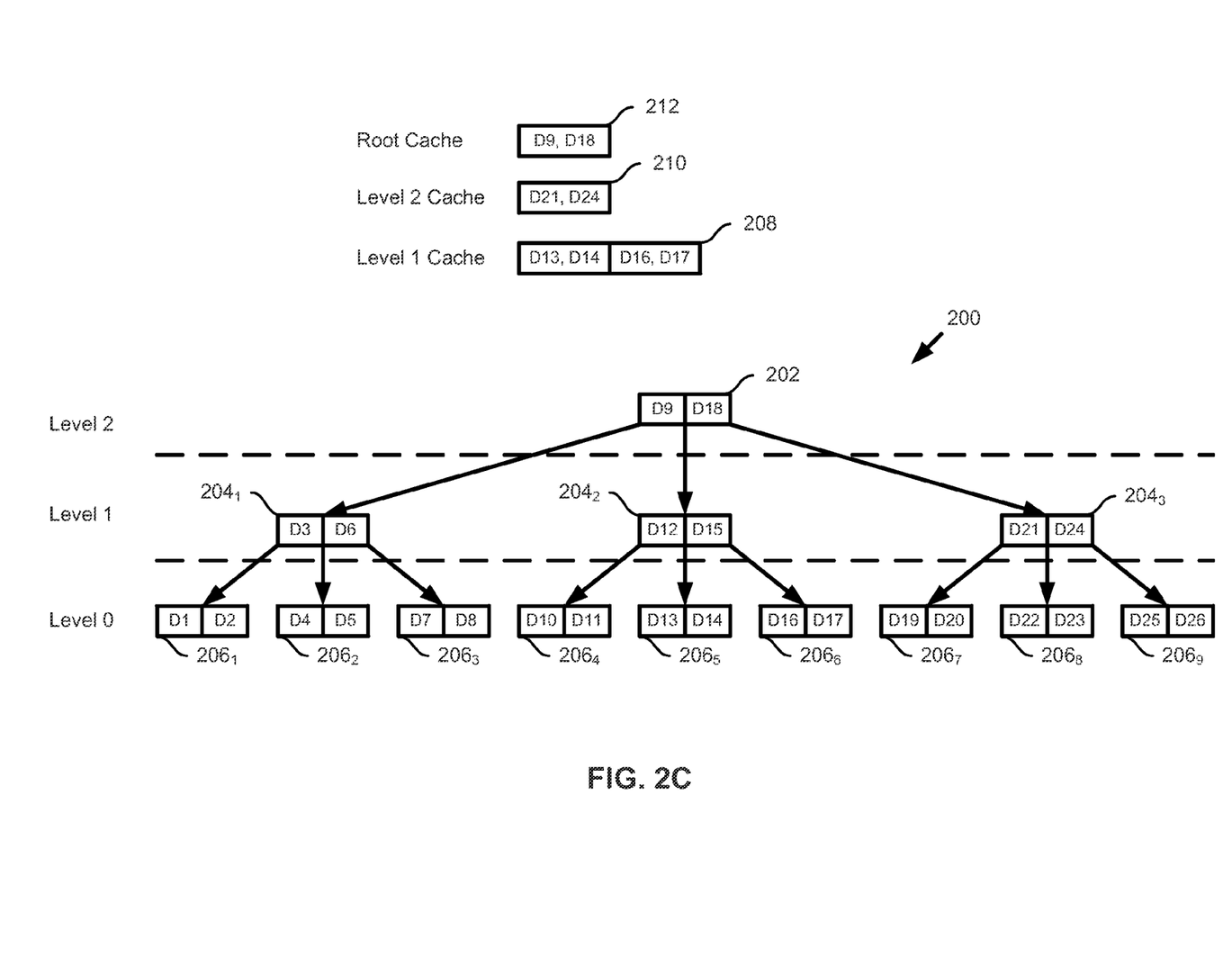

FIG. 2C depicts the tree structure 200 and the caches 208 and 210 after several pre-fetched blocks have been accessed by one or more a processes. As shown, level 1 cache 208 now contains the data from node 206$_5$ (storing data elements D13 and D14) and the block associated node 206$_6$ (storing data elements D16 and D17). According to various embodiments, these blocks can be loaded into the cache once the last right link at that level (i.e. node 206$_3$ storing data elements D7 and D8) has been accessed. Once accessed, the cached data blocks can be removed from the cache and a new data block can be pre-fetched (as long as that block is referenced by the current node as right link).

FIG. 2C also depicts a different block stored in the level 2 cache 210. Instead of the previously cached block associated with node 204$_2$, the level 2 cache 210 now contains the block associated with node 204$_3$ (storing data elements D21 and D24). Similarly to the case with the level 1 cache, this is because the previously-cached block associated with node 204$_2$ has been accessed and no longer needed to be cached. Accordingly, it was removed from the level 2 cache 210 and the new block associated with node 204$_3$ was subsequently pre-fetched and stored in level 2 cache 210.

Figure 2D:
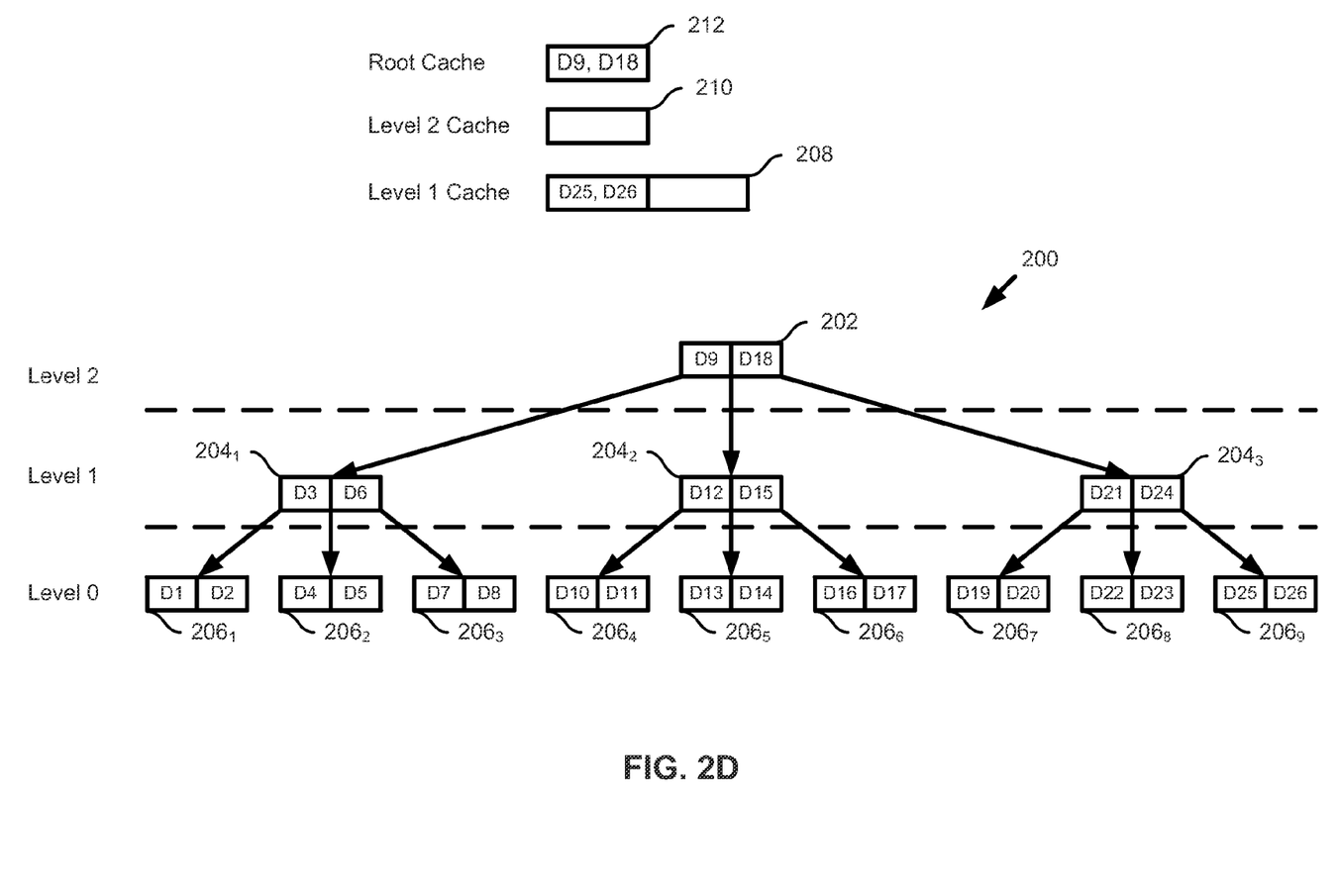

FIG. 2D depicts the tree structure 200 and caches 208 and 210 after almost all of the blocks have been accessed and deleted from the caches 208 and 210. Indeed, as shown in FIG. 2D, the only cached block (apart from the root block) is the block associated with node 206$_9$ (storing data elements D25 and D26), which is the right-most node. This is one of the few times when the caches 208 and 210 need not be filled to their maximum because there are, in fact, no blocks that need to be accessed.

Figure 3:
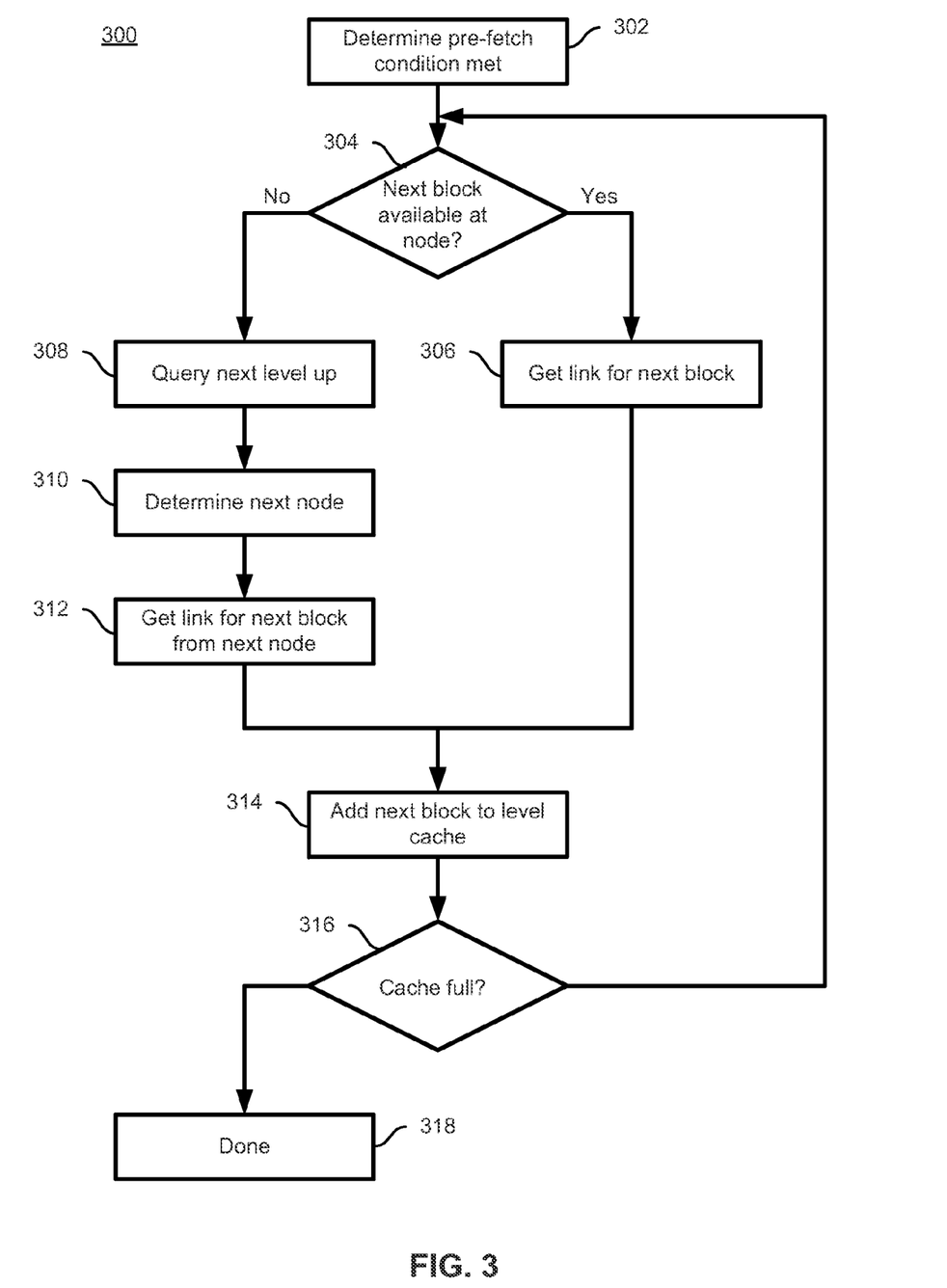
FIG. 3 is a flowchart depicting a method of prefetching data according to various embodiments of the disclosure.

FIG. 3 depicts a method 300 of initially pre-fetching data elements according to various embodiments. To aid the explanation, FIG. 3 will be described with reference to FIGS. 2A to 2D, however the method 300 depicted by FIG. 3 need not be so limited to those embodiments.

As shown, the process 300 can begin at step 302 by determining that a pre-fetch condition has been met. A pre-fetch condition may be met in a number of ways according to various embodiments. For instance, an initial data access or construction event may trigger a pre-fetch condition because all of the caches associated with the various levels of a tree structure (e.g., tree structure 100) might be empty. Similarly, any subsequent read request might also trigger a pre-fetch condition because a read block or blocks can be removed from a cache (e.g., cache 208) thereby leaving the cache with empty slot.

At step 304, it is determined whether the next block (or link/pointer to the next data element) is available at the current node. For instance, referring to FIG. 2B by way of example, assume that the block associated with node 206$_2$ has just been pre-fetched and loaded into the level 1 cache 208. In this case, the "current node" would be node 204$_1$. Accordingly, at step 304, the method 300 would determine that the next block is, indeed, available at the current node because the next block is associated with node 206$_3$, which is linked to by data element D6 stored in node 204$_1$. By contrast, after storing the block associated with node 206$_3$ into the cache, the method 300 would determine that the next block was not available at the current node 204$_1$ because the next block (associated with node 206$_4$) would, instead, be available at the next node 204$_2$.

If, at step 304, the method determines that the next block is available at the current nodes, then the link for the next block is retrieved at step 306. For instance, in the example described above, the link for node 206$_3$ could be retrieved at this point.

However, if at step 304, it is determined that the next block is not available (because the current node has been exhausted) at the current node (204$_1$ in our example), then a level up can be queried at step 308. For instance, if the "current node" is node 204$_1$ and the next block to be cached is the block associated with node 206$_4$, then the method 300 would query node 202 to find the link to the next node 204$_2$ at step 310. The link for the next block can be retrieved from the next node at step 312.

At step 314, the next block (retrieved either at step 306 or 312) can be added to the cache (e.g., level 1 cache 208). If at step 316, the method 300 determines that the cache (e.g., one of caches 208 or 210) is not full, then it loops back to step 304. In the example shown in FIG. 2B, such a determination would be made, for instance, prior to storing the block associated with node 206$_3$ (containing data elements D7 and D8) in the level 1 cache 208. However, if it is determined that the cache 208 is full, then the method 300 can end at 318.

Figure 4:
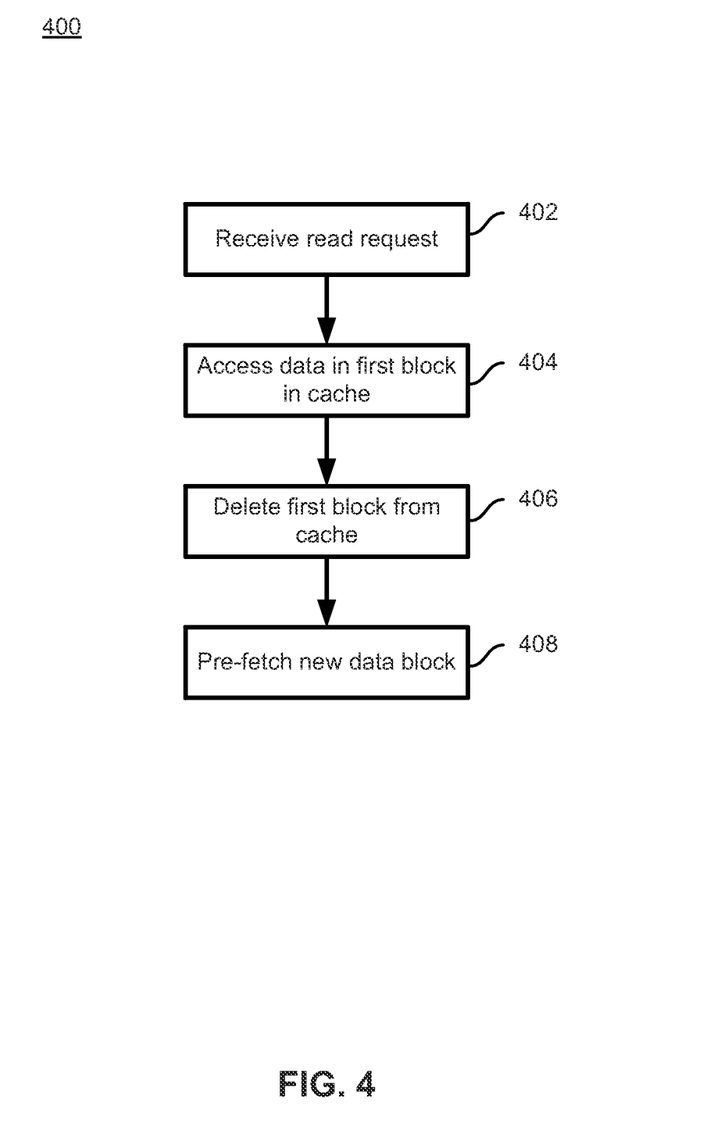
FIG. 4 is a flowchart depicting a method of prefetching data according to various embodiments of the disclosure.

FIG. 4 depicts a method 400 for managing caches (e.g., caches 206 and 208) according to various embodiments. To aid the explanation, FIG. 4 will be described with reference to FIGS. 2A to 2D, however the method 400 depicted by FIG. 4 need not be so limited to those embodiments.

The method 400 begins at step 402 when a read request 402 is received. At this point, the block in a cache (e.g., the block associated with node 206$_2$ storing D4 and D5 in cache 208 as shown in FIG. 2B) can be accessed at step 404. After accessing the first block it can be deleted from cache 208 since it no longer needs to be cached at step 406. At step 408, a new block (e.g., the block associated with node 206$_4$) can be pre-fetched to fill the empty space left by the deleted block after its deletion from the cache 208. This process can be repeated each time a data element is accessed. For instance, as shown in FIG. 2C, the initially cached blocks (associated with nodes 206$_2$ and 206$_3$) have been deleted and, after several subsequent accesses and deletions, the blocks associated with nodes 206$_5$ and 206$_6$ are now stored in the level 1 cache 208.

Figure 5:
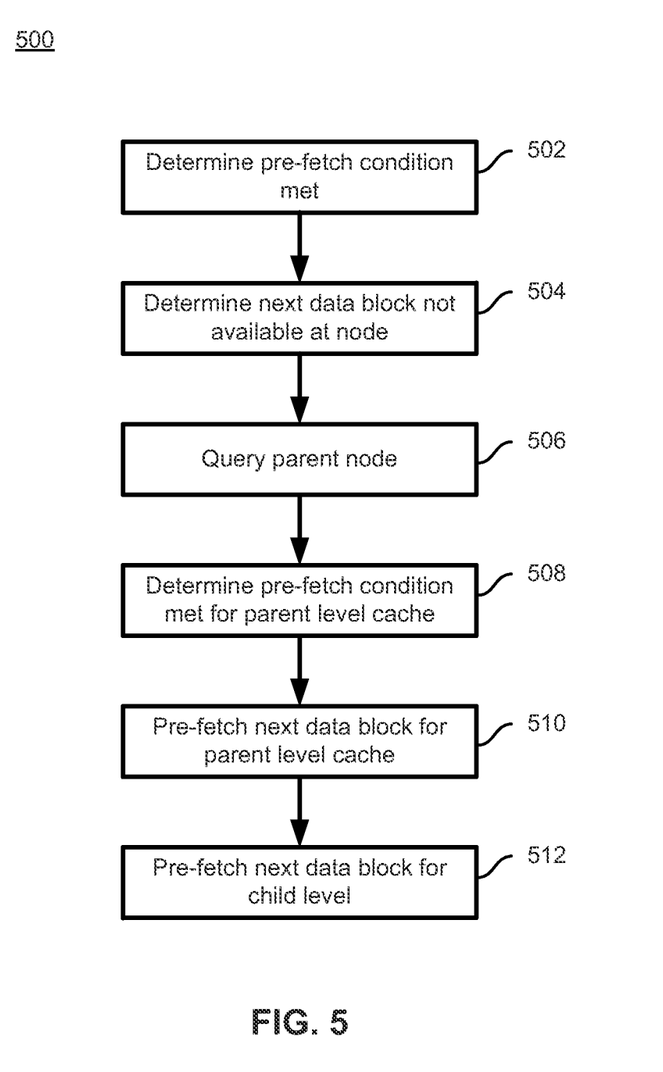
FIG. 5 is a flowchart depicting a method of prefetching data according to various embodiments of the disclosure.

FIG. 5 depicts a method 500 for pre-fetching data blocks according to various embodiments. Again, to aid the explanation, FIG. 5 will be described with reference to FIGS. 2A to 2D, however the method 500 depicted by FIG. 5 need not be so limited to those embodiments.

According to the method 500 it can be determined that a pre-fetch condition is met at step 502. For instance, an initial data access may trigger a pre-fetch condition because all of the caches associated with the various levels of a tree structure (e.g., tree structure 100) might be empty. Similarly, any subsequent read request might also trigger a pre-fetch condition because the read data can be deleted from a cache (e.g., caches 208 and 210) thereby leaving the cache unfilled.

After determining that a pre-fetch condition is met at step 502, the method can determine that a next block is not available at the current node at step 504. For instance, in the exemplary embodiment depicted in FIG. 2B, if the current node is node 204$_1$, the method 500 might determine that the next block is not available at node 204$_1$ and is, instead, available at one of the other child nodes of 204.

At step 506, after determining that the next data (e.g., data D7) is not available at the current node, the method 500 can query the parent node (e.g., node 202) at step 506. It can then be determined that a pre-fetch condition is met for the parent level cache at step 508. For instance, as shown in FIG. 2C, after accessing data elements D4 and D5, the method might determine that the level 2 cache 210 associated with the child nodes 204 needs to have the block associated with 204$_3$ stored in it.

After determining that a pre-fetch condition is met for the parent level cache (e.g., level 2 cache 210), the next block (i.e., the block associated with node 204$_3$) can then be pre-fetched and stored in the level 2 cache 210 at step 510. The next block for the child node level can then be pre-fetched and stored in the level 1 cache 208 at this point. For instance, if the next block to be cached is the block associated with node 206$_5$, then that block can be pre-fetched and stored in the level 1 cache 208, as shown in FIG. 2C.

As discussed, the first pre-fetch action can be triggered when a first value is accessed. For instance, the scenario when the first value is accessed is similar to what is directed in FIG. 2A. Both level 1 cache 208 and level 2 cache 210 at this point are empty. In general, the first un-accessed block will be the block stored in a cache at any given level. For instance, the first un-accessed block in FIG. 2A is the block associated with node 206$_2$. Accordingly, the block associated with node 206$_2$ is stored in the first position of the level 1 cache 208.

According to some embodiments, each pre-fetch action can be triggered when the last value (or within a predetermined percentage of last values) is accessed from a node. This is the point when the first element in the cache is going to be accessed by the next read action. At this point we can remove this element from the cache (to prepare it for a read action) and read one more element to keep the cache full. This action necessitates remembering the last item referred to in the level above during the last pre-fetch action.

As mentioned above, each pre-fetch action may potentially trigger pre-fetch actions in the level above. This effect may cascade in multiple levels. Complexity arises when the cache size in a non-leaf level is limited to hold one element alone. In such a memory constrained scenario, cascading the pre-fetch actions will not work correctly unless a blocking read is used for the next element at the non-leaf level. The choice of actions can, therefore be one of the following:

(1) the pre-fetch action pays the price of a blocking read at the non-leaf level;
(2) a cache of at least 2 elements can be maintained per level, which in a memory constrained environment will reduce the cache size for the lowest non-leaf level; and
(3) the lowest non-leaf level cache can be filled up when accessing the first value at the level just one up.

Figure 6:
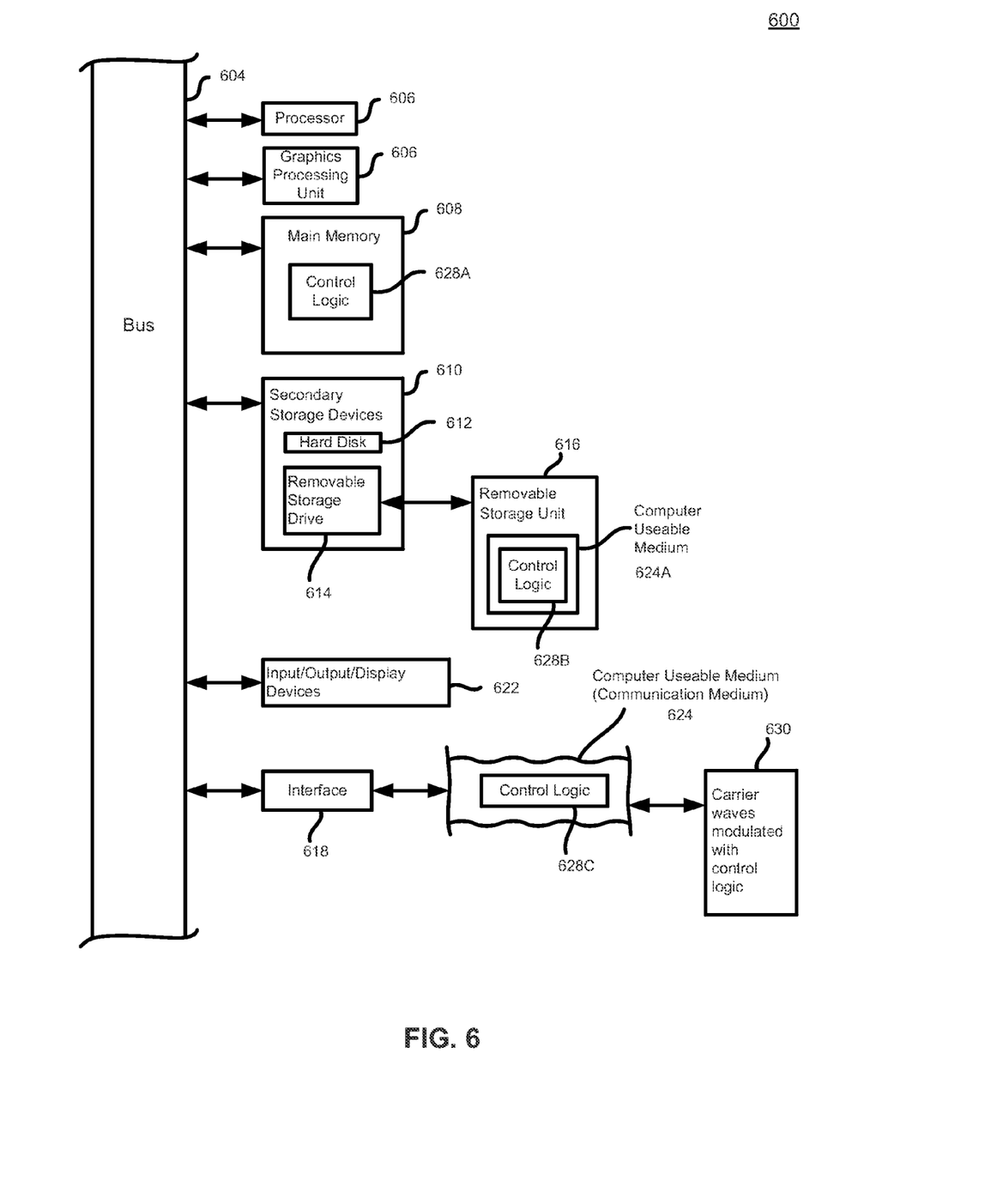
FIG. 6 is an example computer system useful for implementing various embodiments.

Various embodiments can be implemented, for example, using one or more well-known computer systems, such as computer system 600 shown in FIG. 6. Computer system 600 can be any well-known computer capable of performing the functions described herein, such as computers available from International Business Machines, Apple, Sun, HP, Dell, Sony, Toshiba, etc.

Computer system 600 includes one or more processors (also called central processing units, or CPUs), such as a processor 604. Processor 604 is connected to a communication infrastructure or bus 606.

Computer system 600 also includes user input/output device(s) 603, such as monitors, keyboards, pointing devices, etc., which communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use the disclosure using data processing devices, computer systems and/or computer architectures other than that shown in FIG. 6. In particular, embodiments may operate with software, hardware, and/or operating system implementations other than those described herein.

Figure 7:
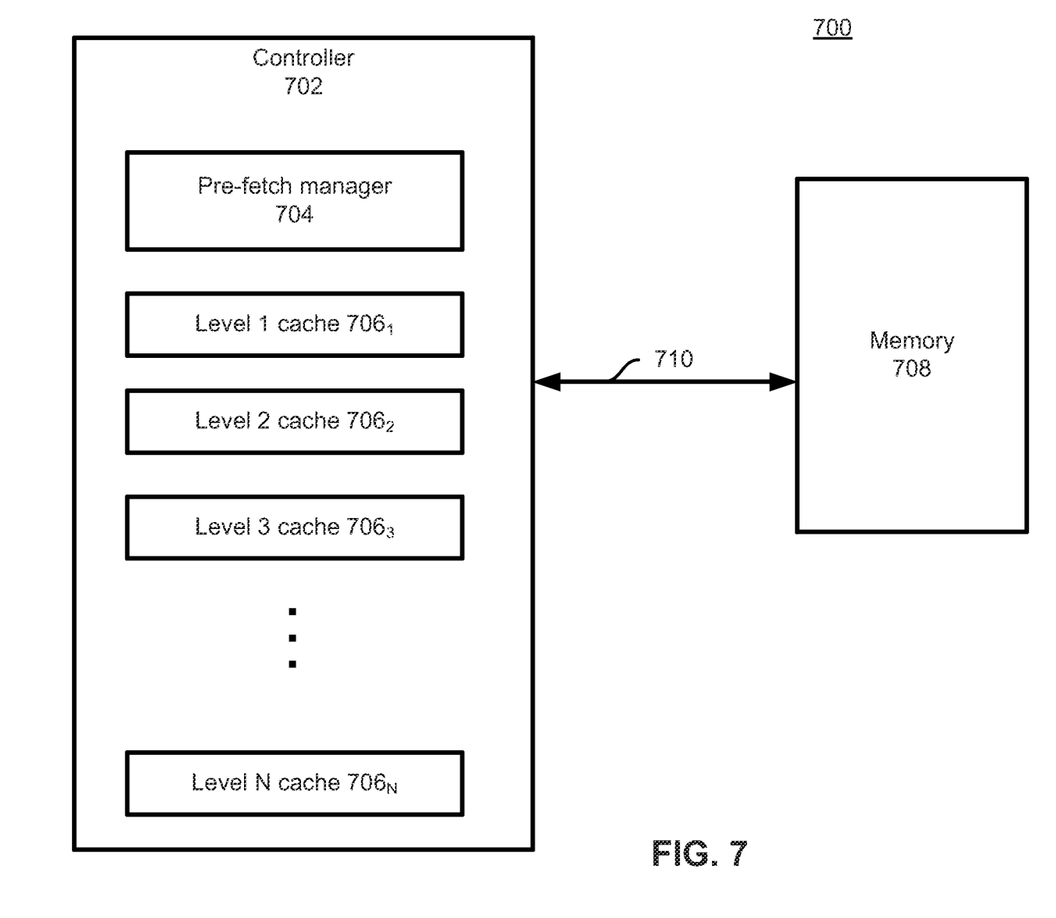
FIG. 7 is a functional block diagram depicting a system according to various embodiments of the disclosure.

FIG. 7 depicts a system 700 according to various embodiments of the disclosure. The system 700 may include a controller block 702 and a memory 708. The controller may comprise one or more processor and/or computer systems such as computer system 600 described above. Memory 708 may be any suitable computer readable medium, such as those described above. Memory 708 is communicatively coupled to controller 702 via communications link 710.

According to various embodiments, the controller 702 may include a pre-fetch manager 704 and a number of caches $706_1$ to $706_N$ (generically "caches 706"). In some embodiments, the number of caches may depend on the number of levels that a tree (e.g., tree structure 200) has. However, it is also possible for the controller 702 to contain a pre-determined number of caches 706. In such an embodiment, if a tree 200 has more levels than the controller 702 has caches, preference may be given to the lower levels of the tree 200.

The pre-fetch manager 704 may comprise may comprise suitable logic, software, and/or circuitry to manage prefetching data elements to fill the caches 706 from data elements associated with a tree (e.g., tree 200). For instance, pre-fetch manager 704 may be configured to perform any of the method 300, 400, or 500 depicted in FIGS. 3, 4, and 5, respectively. Additionally, the pre-fetch manager 704 can split the pre-fetch action to each level ensuring the cache at level remains full at all time, except when accessing the right edge of b-tree.

Additionally, the pre-fetch manager 704 may be operable to conduct the processes depicted in FIGS. 2A to 5.

It is to be appreciated that the Detailed Description section, and not the Summary and Abstract sections (if any), is intended to be used to interpret the claims. The Summary and Abstract sections (if any) may set forth one or more but not all exemplary contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope should not be limited by any of the above-described exemplary embodiments, but should be defined only in accordance with the following claims and their equivalents.

What is claimed is:

1. A method, comprising:
   determining, by a controller, that a pre-fetch condition has been met for a first cache associated with a first level of a balanced tree (b-tree);
   retrieving a link to a memory for data element to be read into the cache by accessing a second level of the b-tree;
   writing the data element associated with the retrieved link into the cache;
   determining that a pre-fetch condition has been met for a second cache associated with the second level of the b-tree; and
   pre-fetching data for the second cache.

2. The method of claim 1, wherein a capacity of the first cache is bigger than a capacity of the second cache.

3. The method of claim 1, wherein determining that the pre-fetch condition has been met for the first cache comprises determining that a read request has been made to the controller.

4. The method of claim 1, wherein determining that the pre-fetch condition has been met for the first cache comprises determining that a pre-determined portion of a previously cached data element has already been accessed.

5. The method of claim 1, wherein determining that the pre-fetch condition has been met for the first cache comprises determining that a first data element in the cache is going to be accessed by the next read action.

6. The method of claim 5, further comprising removing the first data element from the cache.

7. The method of claim 1, further comprising:
   determining that an additional pre-fetch condition has been met for the first cache; and
   pre-fetching an additional data element.

8. The method of claim 1, wherein the first level of the b-tree is a child level of the second level of the b-tree.

9. The method of claim 1, further comprising pre-fetching a number of additional data elements of data sufficient to fill the first cache.

10. A system, comprising:
    a memory; and
    a controller communicatively coupled to the memory and configured to:
       determine that a pre-fetch condition has been met for a first cache associated with a first level of a balanced tree (b-tree);
       retrieve a link to a data element to be read into the cache by accessing a second level of the b-tree;
       write the data element of data associated with the retrieved link into the cache; and determine that a pre-fetch condition has been met for a second cache associated with the second level of the b-tree; and pre-fetch data for the second cache.

11. The system of claim 10, wherein a capacity of the first cache is bigger than a capacity of the second cache.

12. The system of claim 10, wherein the controller is configured to determine that the pre-fetch condition has been met for the first cache by determining that a read request has been made to the controller.

13. The system of claim 10, wherein the controller is configured to determine that the pre-fetch condition has been met for the first cache by determining that a pre-determined portion of a previously cached data element has already been accessed.

14. The system of claim 10, wherein the controller is configured to determine that the pre-fetch condition has been met for the first cache by determining that a first data element in the cache is going to be accessed by the next read action.

15. The system of claim 14, wherein the controller is further configured to remove the first data element from the cache.

16. The system of claim 10, wherein the controller is further configured to:
determine that an additional pre-fetch condition has been met for the first cache; and
pre-fetch an additional data element.

17. The system of claim 10, wherein the first level of the b-tree is a child level of the second level of the b-tree.

18. The system of claim 10, wherein the controller is further configured to pre-fetch a number of additional data elements of data sufficient to fill the first cache.

19. The method of claim 1, further comprising:
determining whether a next data element is available at a current node;
retrieving a link to a memory for the next data element; and
writing the next data element to the cache.

20. The system of claim 10, wherein the controller is further configured to:
determine whether a next data element is available at a current node;
retrieve a link to a memory for the next data element; and
write the next data element to the cache.

* * * * *